3,333,024
BLOCK POLYMERS, COMPOSITIONS CONTAINING THEM AND PROCESS OF THEIR PREPARATION
Walter R. Haefele, Orinda, and Charles A. Dallas and Marvin A. Deisz, Berkeley, Calif., assignors to Shell Oil Company, New York, N.Y., a corporation of Delaware
Filed Apr. 25, 1963, Ser. No. 275,688
7 Claims. (Cl. 260—880)

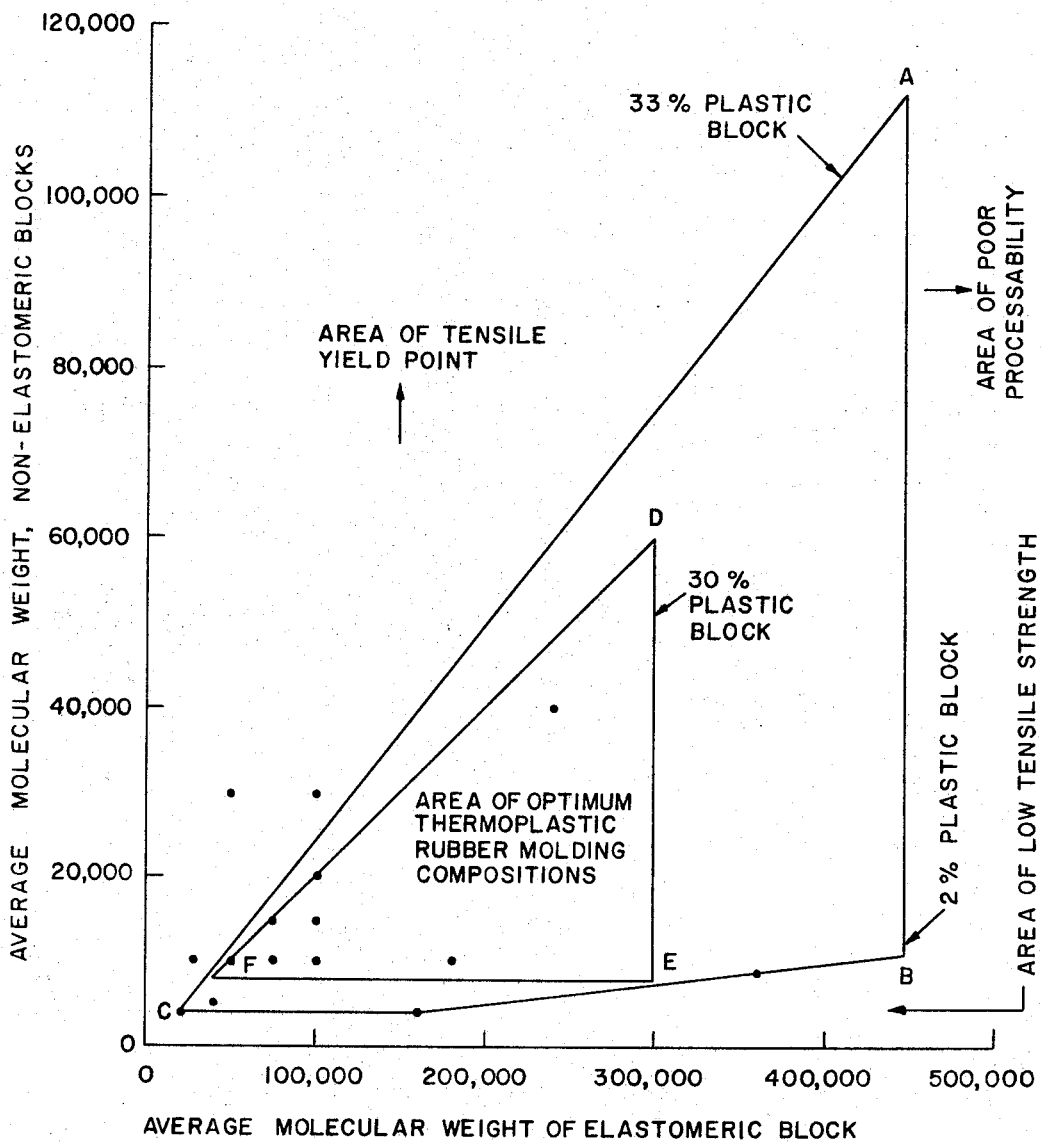

This invention is concerned with novel block copolymers, their compositions and processes for their preparation. More specifically, the invention is directed to certain block copolymers which are capable of broad utility without being vulcanized.

Rubbers and elastomers of either natural or synthetic origin normally require vulcanization in order to obtain useful elastomeric properties. Before vulcanization, rubbers possess tacky properties and low strength which make them of little utility except as rubber cements. Another of their prime shortcomings is that of stability relative to either heat or oxidation. Optimum elastomeric properties are not attained until the usual rubber has been subjected to a vulcanization treatment such as by means of heating the sulfur, sulfur compounds, peroxides, irradiation or other means. One of the alterations in properties which occurs together with desirable changes is that of insolubilization in common hydrocarbon solvents. While this property may be of advantage in certain situations wherein solvents or oils may cause deterioration of the rubber, for many purposes (such as the application of paints, films, certain molded articles, etc.), insolubilization is in fact a substantial disadvantage. Because of it, it has been necessary in many cases to apply vulcanized rubbers in the form of latices which entails the use of expensive dispersants and other shortcomings which are of little benefit to the rubber per se as well as creating costly transportation charges due to the large amount of water present in such latices.

In the molding of many articles, it has been found that the losses of vulcanized rubber may be unduly large. For example, vulcanization is sometimes accompanied by compounding the rubber with extenders and reinforcing agents as well as with a vulcanization agent and then subjecting the composition so formed to heating in a mold or extruder. However, the scrap material left from such operation is largely unuseable except as a filler or reclaim for new rubber compositions. In other words, it cannot be readily remolded since it is in a relatively intractable state with respect to workability or reprocessing.

One of the paramount disadvantages of prior rubber materials comprises their lack of suitability for processing in the numerous types of molding equipment now used in the plastics industry and the limitations placed upon the use of high processing temperatures due to the tendency of most elastomeric materials to be degraded upon the application of heat and especially in the presence of oxygen and/or light.

Most thermoplastic materials do not possess these disadvantages. Not only are they normally stable at molding temperatures but also any scrap material obtained in the course of forming castings or moldings from a thermoplastic usually may be simply remelted and reused in the same or different casting or molding operations. In many instances, this would be an exceedingly valuable property for rubber compositions to possess, namely the ability to be reprocessed coupled with stability necessary for molding or other processing operations.

Numerous attempts have been made to copolymerize various polymerizable materials to obtain rubber like substances. Some of these have been found to be useful but in substantially all cases, it has been necessary to go through the above described vulcanization procedures in order to obtain useful compositions. In other words, it cannot be readily remolded since it is in a relatively intractable state with respect to workability or reprocessing.

One of the paramount disadvantages of prior rubber materials comprises their lack of suitability for processing in the numerous types of molding equipment now used in the plastics industry and the limitations placed upon the use of high processing temperatures due to the tendency of most elastomeric materials to be degraded upon the application of heat and especially in the presence of oxygen and/or light.

Most thermoplastic materials do not possess these disadvantages. Not only are they normally stable at molding temperatures but also any scrap material obtained in the course of forming castings or moldings from a thermal plastic usually may be simply remelted and reused in the same or different casting or molding operations. In many instances, this would be an exceedingly valuable property for rubber compositions to possess, namely the ability to be reprocessed coupled with stability necessary for molding or other processing operations.

Numerous attempts have been made to copolymerize various polymerizable materials to obtain rubber like substances. Some of these have been found to be useful but in substantially all cases, it has been necessary to go through the above described vulcanization procedures in order to obtain useful compositions. Other attempts have been made to form so-called "block" copolymers. By this is meant polymeric chains containing alternating blocks of homopolymers or of copolymers, each block differing materially from the next adjacent block. However, in forming such block copolymers, the ultimate elastomeric systems have not been attained. This is due in part to the fact that the initiator environments and solvents employed during polymerization have been such that the block copolymers formed have an undesirable structure such as would result from polymerization in polar solvents at low temperatures. This in turn means that the products have pour properties of unvulcanized rubber and, in fact, possess mediocre to poor properties even after vulcanization. Most materials of this type are therefore of little interest for the usual rubber end uses.

Other attempts have been made to synthesize block copolymers overcoming the above disadvantages. While improved structures have been obtained by the use of nonpolar solvents during polymerization and the choice of proper block identity to provide elastomeric compounds having the stress-strain properties of prior art vulcanized rubbers, the materials are service-limited with respect to the temperature at which they may be processed, as well as by certain limitations relative to their stress-strain properties. Thus, while the feature of self-vulcanization (i.e., the provision of properties characteristic of vulcanized rubbers without the use of vulcanizing agents), the compositions still leave much to be desired relative to stability at processing temperatures, capability of processing in thermal plastic molding equipment and other physical limitations.

It is an object of the present invention to provide improved elastomeric compositions. It is another object of the present invention to provide novel block copolymers having substantially improved elastomeric properties. It is a further object of the invention to provide improved elastomeric block copolymers useful without vulcanization. It is a still further object of the invention to provide compositions having substantially improved physical properties relative to oxidative and thermal stability and capable of processing in the usual thermoforming equipment. Other objects will become apparent during the following description of the invention.

Now, in accordance with the present invention, new compositions of matter are provided which have excellent elastomeric (e.g. stress-strain) properties without vulcanization, can be formed in the usual polymer processing equipment and are thermally and oxidatively stable at processing temperatures necessary for the use of such equipment. These new block polymers are critically limited with respect to their unsaturation and with respect to their composition as follows: They comprise elastomeric block copolymers having the general configuration

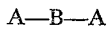

wherein each A is an independently selected non-elastomeric polymer block of an alkenyl substituted aromatic hydrocarbon, said block having an average molecular weight between about 4,000 and 115,000 and B is an elastomeric polymer block of a conjugated diene having an average molecular weight between about 20,000 and 450,000, the block copolymer containing not over about 30% of residual unsaturation. Not only are the block copolymers of this invention limited relative to the average molecular weight of the individual blocks and also limited relative to the maximum degree of unsaturation, but the block copolymers in order to be suitable as elastomers are further limited relative to the proportion of non-elastomeric end groups to elastomeric center blocks, the maximum amount for this purpose being about 33% weight of plastic end groups based on the total weight of the block copolymers and the minimum being about 2% by weight.

FIGURE I graphically presents the generic and preferred areas of the invention, both with respect to block lengths and ratio of plastic blocks to elastomeric blocks. The area ABC defines the generic concept of the invention, while the area DEF defines the preferred block copolymers.

Preferably these block copolymers (prior to hydrogenation) are those in which the elastomeric polymer block is formed from a conjugated diene hydrocarbon having from 4–10 carbon atoms per molecule. Still more preferably, the block copolymers are those in which the end blocks (prior to hydrogenation) comprise polymer blocks of a vinyl aromatic hydrocarbon connected by a block of a $C_{4-10}$ conjugated diene, the end blocks having preferred molecular weight ranges between about 8,000 and about 60,000 while the center block of the conjugated diene has an average molecular weight of between about 50,000 and about 300,000. The preferred class of copolymers is furthermore characterized by being hydrogenated to an extent sufficient to reduce the residual unsaturation to less than about 20. By "residual unsaturation" is meant the original unsaturation of the polymer compared with the unsaturation of the polymer after a hydrogenation treatment, the degree of unsaturation being determined by the usual analytical technique. Furthermore, in the preferred category of block copolymers, exhibiting superior stability and processing characteristics, the weight proportion of non-elastomeric end groups is between about 5% and about 30% weight based on the total block copolymer.

In accordance with one aspect of the invention, it has been found that the block copolymers may be modified with pigments (e.g., carbon blacks) and extending oils (e.g., petroleum oils). The presence of the compatible extending oil permits a broadened area of tolerance of the average molecular weight of the elastomeric blocks. Then, when 0–100 parts by weight of pigment and 0–100 parts by weight of extending oil are combined with 100 parts by weight of block copolymer, the average molecular weight of the elastomeric block can be expressed as a number between 200 Y and 4500 Y, wherein Y is a number between the parts by weight of the block copolymer (100) and the sum of the parts by weight of the extending oil plus the copolymer (100–200). The preferred area is between 400 Y and 3000 Y.

Still in accordance with the present invention, a process is provided for the preparation of the subject block copolymers which comprises polymerizing an alkenyl aromatic hydrocarbon in the presence of a lithium-based catalyst to provide a block A of essentially all of said hydrocarbon, thereafter adding monomers of a conjugated diene to the living block polymer A (terminated with a lithium radical), block copolymerizing essentially all of said diene with the first block A to form an intermediate block polymer A—B, subsequently adding monomeric alkenyl aromatic hydrocarbons and block polymerizing the same with the intermediate, whereby a block copolymer is formed, said polymer having the general configuration

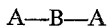

wherein the individual blocks have the molecular weight limitations expressed hereinbefore, and thereafter hydrogenating the polymer so obtained so as to result in a hydrogenated block copolymer having less than 30% residual unsaturation.

The process of the invention may comprise an alternative route, wherein the block copolymer is prepared by using a dilithium initiator such as a dilithium aromatic hydrocarbon, initially polymerizing the conjugated diene to form the center block terminated on each end with a lithium radical and thereafter block polymerizing on each end the alkenyl aromatic hydrocarbon to form the above-described block copolymer A—B—A and thereafter hydrogenating the same.

The block polymers of this invention have been found to have superior stress-strain properties in addition to outstanding thermal and oxidative stability which, together with their self-vulcanizing characteristics provides elastomeric compositions suitable for a wide variety of molding and other processing operations which the usual elastomeric polymers cannot be subjected to.

The critical difference between the terminal blocks which are non-elastomeric and the center block which is elastomeric may be expressed in the terms of the definition of an elastomer contained in ASTM Special Technical Bulletin No. 184: "A substance that can be stretched at room temperature to at least twice its original length and, after having been stretched and the stress removed, returns with force to approximately its original length in a short time."

The block copolymers are further characterized insofar as their degree of unsaturation is concerned. The hydrogenation of the block copolymers reduces this theoretical unsaturation to less than about 30% of its original value and preferably to an extent of less than about 20% thereof. The reduction of degree of unsaturation is measured by means of iodine number with respect to diene unsaturation, while aromatic unsaturation is measured by ultraviolet or infrared analyses. The reduction in unsaturation to less than 30% of the original values should be in both elastomeric and in plastic blocks.

The elastomeric blocks preferably comprise those prepared by polymerization of one or more conjugated dienes having from 4 to 10 carbon atoms per molecule and preferably from 4 to 6 carbon atoms per molecule. These comprise particularly butadiene and isoprene as well as alkylated isomers and analogs thereof, including methyl isoprene as well as copolymers of conjugated diolefins with alkenyl aromatic hydrocarbons of which the preferred species comprises styrene-butadiene copolymers. Thus, it will be seen that the physical characteristics of the block copolymer may be varied over a wide range dependent upon the identity of the elastomeric mid section and the average molecular weight thereof as well as upon the spread of molecular weights from minimum to maximum throughout the stated operable range. By "operable" in the present instance is meant those compositions which provide a maximum number of desired physical properties so as to provide the most effective elastomeric block copolymers for the contemplated end uses.

It is of course logical to assume that other block copolymers made from the same monomers but having average molecular weight and block ratio outside of the range being claimed here will have some desirable properties and may in fact be used for a particular utility. However, the class of block copolymers claimed in the present application are those found to have the maximum number of desirable properties in a single product especially when thermoforming processes are contemplated. Thus, block copolymers having higher molecular weights in either plastic or elastomeric blocks are contemplated for specialized applications, although they are not claimed herein.

The non-elastomeric end polymer blocks may comprise homopolymers or copolymers but preferably are prepared from alkenyl aromatic hydrocarbons and still more preferably from vinyl aromatic hydrocarbons wherein the aromatic may be either monocyclic or polycyclic (followed by hydrogenation of the block copolymer). Typical species include styrene, methyl styrene, vinyl xylene, ethyl vinyl xylene, isopropyl styrene, vinyl naphthalene and the like. From one or more of these monomeric alkenyl aromatic hydrocarbons, the end blocks are readily prepared by polymerization with a lithium based catalyst. The end block may be the same or different as long as they meet the generic description of these end blocks given hereinbefore.

The preferred class of catalyst most useful for the preparation of the subject block copolymers may be generically described as "lithium based initiators." These include lithium metal, alkyl lithium compounds and aromatic lithium compounds containing one or more lithium radicals. The two most preferred classes of materials for the preparation of the subject block copolymers include the alkyl lithiums wherein the alkyl radical has from 1 to 10 carbon atoms and the dilithium aromatics thus, the preferred species include butyl lithium, secondary butyl lithium, isobutyl lithium, isoamyl lithium, dilithium naphthalene, dilithium stilbene and the like.

Polymerization is normally conducted at temperatures in the order of $-20$ to about $100°$ C., preferably at temperatures between about 20 and $65°$ C. The proportion of initiators should be maintained as low as possible but may be varied over a relatively wide range from about 1 to about 200 p.p.m. based on the weight of the monomers present, the proportion of the catalyst being controlled first by the amount of pure monomer and secondly by the amount of catalyst which will be consumed by acetylenic or other undesirable impurities with which the monomers may be contaminated. The theoretical amount of catalyst required is one lithium radical for each polymeric molecule.

The basic process when using a lithium based catalyst comprising forming a solution of an inert hydrocarbon such as alkanes or alkenes and the monomer from which the initial block polymer is to be made. Utilizing alkyl lithium compounds as typical, the first block to be formed is one of the terminal polymeric blocks of alkenyl aromatics. Therefore, the monomer predominating in this initial mixture will be of the latter type, such as styrene. The lithium initiator is then injected and the temperature of the mixture maintained within the range specified above to produce a first terminal polymeric block having an average molecular weight between about 4000 and about 115,000, this block being terminated on one end with a lithium radical and being referred to as a "living polymer." At this time, without further alteration of this lithium terminal radical, the monomer from which the elastomeric mid section is to be produced is added. The temperature, initiator concentration, solvent ratio, etc., may be adjusted at this time to optimize the production of an elastomeric mid section block which is attached to the first non-elastomeric block by displacement of the lithium radical. Again, the conditions are adjusted so that essentially all of the second monomer is exhausted at the time the desired average molecular weight of the elastomeric mid section is obtained. After this, a second addition of an alkenyl aromatic hydrocarbon is made to produce the second terminal block, which in turn displaces the terminal lithium radical from the growing polymer chain.

The basic polymer produced by this process now comprises one having the desired block relationship, block identity and molecular weight ranges and has the stress-strain properties achieved by other rubbers only after the latter have been vulcanized. However, it is service limited in respect to its ability to be formed or processed in thermo plastic processing equipment and more particularly in its sensitivity to degradation by heat or oxidation. The limitations of these unsaturated block copolymers are substantially diminished by the hydrogenation of at least 70% of the unsaturated linkages. Preferably, the hydrogenated block copolymers contain no more than about 20% of the original unsaturation after this improving treatment.

Hydrogenation may be conducted under the usual conditions known to experts in this art, utilizing a wide variety of hydrogenation catalysts such as nickel on kieselguhr, Raney nickel, copper chromate, molybdenum sulfide, finely divided platinum, finely divided palladium, platinum oxide, copper chromium oxide and the like, although nickel-kieselguhr is preferred particularly if it has been activated at a temperature between 500 to $800°$ F. for a period of several hours by-passing hydrogen thereover. Hydrogenation pressures are preferably in the range from atmospheric to about 3000 p.s.i.g., the usual range being within 100 to 1000 p.s.i.g. The temperature can range from $75°$ F. to the degradation of the polymer although maximum temperatures are preferably restricted to between 300 and $600°$ F. Reaction times in the range of 124 hours and preferably 2–8 hours can be employed. In the amount of catalyst required is a function of the temperature of hydrogenation and the degree of hydrogenation desired.

In order to obtain polymers of the desired characteristics relative to service temperatures and stability, the unsaturation should be reduced to a value of approximately 0–30, based on the theoretical value of 100% for the unhydrogenated block copolymer. Preferably, the residual unsaturation as in the product should be less than about 20% of the original value. The value desired within this preferred range depends upon the use to which the particularly hydrogenated material is to be put.

The hydrogenated block copolymers prepared according to the process of this invention are white solid materials which are capable of being processed in a wide variety of thermal plastic processing equipment including injection molding, compression molding, blow molding, fiber extrusion, film extrusion and other molding equipment known in the fabricating art. The hydrogenated block copolymers are exceedingly tough and have substantially higher service temperatures than those of their non-hydrogenated precursors, as well as having higher modulus and, more particularly, substantially greater resistance to thermal degradation and oxidative attack.

The hydrogenated block copolymers also exhibit an unexplained improvement in abrasion resistance, strength at elevated temperatures as well as excellent electrical properties. They are suitable for pressure bonding of sheeting materials, such as polyalkene sheets, can be used as binders for rocket propellants and may be used in oil compositions. Higher molecular weight block copolymers including those falling outside of the limits of the present invention may be used as thickeners and viscosity-temperature modifiers for natural and synthetic lubricating oils.

The following examples of the product and process of the invention illustrate the improvements gained thereby.

It will be understood that the materials, quantities, temperatures, pressures, etc., set forth are for the purpose of illustration and should not be construed as unduly limiting the invention other than the ranges set out for the product and process of the invention as given hereinbefore.

EXAMPLE I

Preparation of block copolymers.

This example illustrates the process by which the block copolymers were prepared, variations being made in lithium initiator to control molecular weight and variations in proportions of monomer being made to control the proportion of end blocks to center blocks. Styrene (60 grams) was dissolved in benzene (1400 grams), brought to 40° C., after which 0.003 mols of secondary butyl lithium was added. Polymerization was conducted at 40° C. in a reactor until all of the styrene had been converted to polymer which had an intrinsic viscosity of 0.24 dl./g. Thereafter, isoprene was added to the reaction mixture, (450 grams) and polymerization was continued until complete utilization of isoprene monomer. The styrene-isoprene block polymer so formed had an intrinsic viscosity of 1.32 dl./g. (toluene solvent temperature 25° C.) and a combined styrene content of 14% by weight. Monomeric styrene (60 grams) was added and the polymerization continued until no monomer remained. The resulting styrene-isoprene-styrene block polymer had an intrinsic viscosity of 1.43 dl./g. and a combined styrene content of 22%.

EXAMPLE II

Hydrogenation of block copolymers.

This example describes a typical process for hydrogenating block copolymers studied in the course of making this invention. A 10% solution of the block copolymer such as that prepared in Example I were prepared in cyclohexanes. Hydrogenation of this solution was carried out at 500 p.s.i.g. hydrogen pressure, 145–155° C. for 13 hours using 0.5 grams of nickel on kieselguhr catalysts per gram of polymer. The iodine number (determined in p-dichlorobenzene) of a typical block polymer prior to hydrogenation was 272 $I_2$/100 g. while after hydrogenation the same polymer had an iodine number of 3.6 grams $I_2$/100 g. Ultraviolet analysis (in which combined styrene is determined in cyclohexane at 262 millimicrons) of hydrogenated block copolymer prepared as described herewith indicated that 98.0% of the polystyrene blocks had been hydrogenated. This was typical of most of the hydrogenated polymers prepared using this and similar catalysts. A direct comparison was made of the tensile strength at break both before and after hydrogenation of a block copolymer having the units polystyrene-polyisoprene polystyrene in a ratio of molecular weights of 10,000–50,000–10,000. The tensile strength of the non-hydrogenated polymer was 975 p.s.i. at break, while the tensile strength at break of the hydrogenated polymer was 3700 p.s.i.

In order to determine if this advantage is carried over into compositions containing the polymers, comparative tests were made upon compositions comprising 100 parts by weight of polymer, 75 parts by weight of Dixie clay, 10 parts by weight of titanium dioxide and 1 part by weight of a coloring pigment. The specimens for the tests were molded for 10 minutes at 160° C. The following typical properties were obtained:

TABLE I[a]

| | Non-Hydrogenated | Hydrogenated |
|---|---|---|
| Tensile strength at break, p.s.i. | 675 | 2,545 |
| Modulus at 300% elongation | 800 | 1,335 |
| Percent elongation at break | 445 | 660 |
| Percent set | 19 | 55 |
| Shore A hardness | 17 | 81 |

[a] See ASTM Rubber Test Method D412–61T for details of tests.

Outdoor exposure specimens of the above compositions were molded and placed on a roof. After 6 days exposure, according to ASTM test D–1171, the non-hydrogenated composition had surface cracks and was rated at 3 (4 is the poorest rating shown in the ASTM method). The compositions containing the hydrogenated polymer was rated as 1. After 13 days' exposure, the non-hydrogenated composition was rated 4 and the composition containing the hydrogenated polymer was still 1.

EXAMPLE III

Comparative tests were made both before and after hydrogenation of a number block polymers which both typify the changes in physical properties which occur upon hydrogenation and indicate the critical nature of the relative block proportions and block lengths. Table II presents the data obtained.

TABLE II.—COMPARISON OF PROPERTIES OF HYDROGENATED AND NON-HYDROGENATED STYRENE-ISOPRENE STYRENE BLOCK COPOLYMERS

EXAMPLES OF POLYMERS WITHIN CLAIMED SCOPE OF BLOCK LENGTHS AND PROPORTIONS

| Sample | Block Lengths ×10⁻³ | Hydrogenated | Percent Weight Plastic Block | Tensile Strength, p.s.i. | 300% Modulus, p.s.i. | 500% Modulus, p.s.i. | Elongation at Break, Percent | Set after Break, Percent | Shore A Hardness | Yerzley Resilience, Percent |
|---|---|---|---|---|---|---|---|---|---|---|
| A | 11–83–19 | No | 26.5 | 2,850 | 250 | 375 | 1,150 | 20 | 48 | 80 |
| B | 11–83–19 | Yes | 26.5 | 3,875 | 325 | 650 | 750 | 12 | 64 | 79 |
| C | 17–118–25 | No | 26.5 | 4,800 | 250 | 375 | 990 | 12 | 51 | 79 |
| D | 17–118–25 | Yes | 26.5 | 5,400 | 400 | 1,500 | 660 | 10 | 63 | 80 |
| E | 5–42–7 | No | 22 | 300 | 125 | 175 | 750 | 9 | 28 | |
| F | 5–42–7 | Yes | 22 | 1,275 | 225 | 350 | 1,030 | 33 | 45 | 79 |
| G | 3–300–3 | No | 2 | <50 | (Flows like uncured rubber) | | | | | |
| H | 6–300–3 | No | 2 | 350 | | | | | | |
| I | | Yes | | | | | | | | |
| 6764–200 | 22–112–28 | No | 31 | 5,500 | 325 | 500 | 1,100 | 15 | 63 | |
| 7817–17 | 22–112–28 | Yes | | 5,650 | 400 | 600 | 900 | 32 | 71 | 66 |

Examples of >31, plastic block

| | | | | | | | | | | |
|---|---|---|---|---|---|---|---|---|---|---|
| J | 30–50–30 | No | 54 | 4,000 | 1,250 | 1,400 | 790 | >150 | 97 | Yields |
| K | 30–50–30 | Yes | 54 | 2,800 | 1,925 | | 370 | >140 | 93 | Yields |
| L | 30–100–30 | No | 37 | 4,150 | 325 | 1,200 | 930 | 40 | 68 | Yields |
| M | 30–100–30 | Yes | 37 | 950 | 300 | | 1,080 | >200 | 84 | Yields |

EXAMPLE IV

The effect of varying molding temperature upon the tensile strength of hydrogenated block copolymers was determined. The data given in the following table illustrate the effect obtained. It will be noted that molding temperature has a pronounced effect upon tensile strength. Molding at 180–220° C. produced slabs of highest tensile strength. The elongation and set of one of the samples tested were substantially unchanged by molding temperature but were markedly effected in specimens from the second polymer.

The above data indicate clearly that the non-hydrogenated sample is less suitable for this type of composition and indicates that drastic decomposition occurred during the compounding operation. Comparisons were made between further samples of the block copolymers both before and after hydrogenation as the data which follow show, the hydrogenated counterparts of the original copolymers were generally harder and stiffer and had higher moduli, as well as showing improvements in tensile strength in most cases.

TABLE III.—MOLDING TEMPERATURE VS. STRESS-STRAIN AT 23° C.

| Sample | Block Lengths | Plastic Block Content | Molding Temp. | Tensile Strength at Break | Modulus at 300% Elongation | Modulus at 500% Elongation | Elongation at Break | Percent Set After Break | Shore A Hardness |
|---|---|---|---|---|---|---|---|---|---|
| N | 10-75-10 | 21 | 160 | 4,300 | 350 | 850 | 670 | 8 | 62 |
|   |   |   | 180 | 4,825 | 350 | 650 | 750 | 10 | 63 |
| O | 10-360-10 | 5 | 180 | 650 | 200 | 200 | 1,020 | 50 | 46 |
|   |   |   | 200 | 1,275 | 200 | 200 | 1,250 | 58 | 46 |
| P | 15-75-15 | 29 | 160 | 4,200 | 475 | 1,300 | 620 | 18 | 73 |
|   |   |   | 200 | 5,475 | 400 | 750 | 770 | 25 | 78 |
|   |   |   | 220 | 5,625 | 425 | 775 | 800 | 25 | 79 |
| Q | 15-100-15 | 23 | 160 | 3,775 | 275 | 950 | 650 | 10 | 60 |
|   |   |   | 180 | 4,550 | 300 | 500 | 710 | 18 | 64 |
|   |   |   | 200 | 4,400 | 300 | 550 | 800 | 10 | 64 |
| R | 20-100-20 | 29 | 160 | 4,825 | 375 | 825 | 750 | 30 | 68 |
|   |   |   | 180 | 5,500 | 300 | 550 | 870 | 40 | 73 |
|   |   |   | 200 | 5,650 | 400 | 600 | 900 | 32 | 71 |
|   |   |   | 220 | 5,475 | 325 | 500 | 925 | 30 | 74 |

EXAMPLE V

Tests were carried out of a composition suitable for weather-stripping purposes and the like. One sample contained non-hydrogenated block copolymer and another of the same polymer after hydrogenation. The block polymer was (before hydrogenation) polystyrene-polyisoprene-polystyrene having the average molecular weight of 15,000–75,000–15,000. After molding for 10 minutes at 160° C. the samples of the compositions were tested for their stress-strain properties, the following data being obtained:

TABLE IV.—RECIPES AND TENSILE PROPERTIES OF FILLED BLOCK POLYMERS POLYSTYRENE-POLYISOPRENE-POLYSTYRENE

| Segment Length, M | Hydrogenated 15-75-15 | Not Hydrogenated 15-75-15 |
|---|---|---|
| Polymer, phr | 100 | 100 |
| Dixie clay, phr | 80 | 80 |
| Whiting, phr | 50 | 50 |
| Silica, phr |  |  |
| TiO₂, phr | 20 | 20 |
| Oil, phr | 10 | 10 |
| Petrolatum, phr | 16 | 16 |
| Dye, phr | 10 | 10 |
| Stearic acid, phr | 1 | 1 |
| Blue disp, phr | 1 |  |
| Red, phr |  | 1 |
| Phenolic stabilizer, phr | 0.5 |  |
| Do |  | 1 |
| Molded 10 minutes at 160° C.: |  |  |
| T$_B$, p.s.i | 1,555 | 540 |
| M$_{300}$, p.s.i | 590 | 460 |
| M$_{500}$, p.s.i |  |  |
| E$_B$, percent | 775 | 600 |
| Set, percent | 69 | 36 |
| Shore, A | 73 | 59 |

TABLE V.—NON-HYDROGENATED POLYMERS

| Sample | Intended Block Length ×10⁻³ | Combined Styrene, percent | T$_B$ | M$_{300}$ | M$_{500}$ | E$_B$ | Set | Shore A Hardness |
|---|---|---|---|---|---|---|---|---|
| A | 9-92-25 | 17 | 2,600 | 125 | 175 | 1,280 | 2 | 32 |
| B | 10-77-14 | 21 | 1,850 | 175 | 250 | 1,070 | 10 | 52 |
| C | 16-79-19 | 28 | 4,800 | 225 | 350 | 1,080 | 25 | 61 |

HYDROGENATED POLYMERS

| Sample | Precursor | Block Lengths (×10⁻³) | Vinyl Cyclohexane, percent | T$_B$ | M$_{300}$ | M$_{500}$ | E$_B$ | Set | Shore A Hardness |
|---|---|---|---|---|---|---|---|---|---|
| A | 6764-190 | 9-92-25 | 17 | 4,025 | 250 | 425 | 770 | 12 | 50 |
| B | 7745-14 | 10-77-14 | 21 | 3,875 | 325 | 650 | 750 | 12 | 64 |
| C | 6764-196 | 16-79-19 | 28 | 6,000 | 400 | 875 | 675 | 20 | 75 |

The block polymers of this invention may be utilized for a wide variety of molding operations, including apparatus useful for the molding of thermoplastic materials. The compositions may be modified with flow assist agents such as silicone oils, white mineral oil, low molecular weight polyolefins such as polybutene and chlorinated aromatics such as chlorinated bisphenyls. It is preferred however, to restrict the proportions of these flow assist agents so as to maintain maximum stress-strain properties in the finished compositions. Fillers may be employed if desired, such as those illustrated in several of the foregoing working examples.

We claim as our invention:

1. As a new composition of matter, a hydrogenated block copolymer having the general configuration

A—B—A wherein, prior to hydrogenation,
 (1) each A is a polymerized alkenyl aromatic hydrocarbon block having an average molecular weight of about 4000–115,000;
 (2) B is a polymerized conjugated diene hydrocarbon block having an average molecular weight of about 20,000–450,000;

(3) the blocks A constituting about 2–33 weight per cent of said copolymer;
(4) the unsaturation of the polymer having been reduced by hydrogenation to a value within the range of 0–30% of the original unsaturation.

2. A new composition of matter according to claim 1 wherein the polymeric blocks A are polymers of a vinyl aromatic hydrocarbon and the block B is a polymer of a $C_{4-10}$ conjugated diene.

3. A new composition of matter according to claim 1 wherein the blocks A constitute about 5–30% weight of the copolymer and the copolymer is hydrogenated to reduce the unsaturation of less than 20% of the theoretical.

4. As a new composition of matter, a hydrogenated block copolymer having the general configuration

A—B—A wherein, prior to hydrogenation
(1) each A is a polymerized styrene block having an average molecular weight of about 8000–60,000;
(2) B is a polymerized isoprene block having an average molecular weight of about 50,000–300,000;
(3) the copolymer having been hydrogenated to reduce unsaturation to less than 20% of the original value.

5. As a new composition of matter, a hydrogenated block copolymer having the general configuration

A—B—A wherein, prior to hydrogenation
(1) each A is a polymerized styrene block having an average molecular weight of 4000–115,000;
(2) B is a polymerized butadiene block having an average molecular weight of 20,000–450,000;
(3) the copolymer having been hydrogenated to reduce unsaturation to less than 20% of the original value.

6. A composition according to claim 5 wherein each polystyrene block has an average molecular weight of 8000–60,000 and each polybutadiene block has an average molecular weight of 50,000–300,000.

7. As a new composition of matter, a hydrogenated block copolymer having the general configuration

A—B—A wherein, prior to hydrogenation
(1) each A is a polymerized styrene block having an average molecular weight of 4000–115,000;
(2) B is a polymerized isoprene block having an average molecular weight of 20,000–450,000;
(3) the copolymer having been hydrogenated to reduce unsaturation to less than 20% of the original value.

References Cited

UNITED STATES PATENTS 3,030,346 4/1962 Cooper _____ 260—41
3,239,478 3/1966 Harlan _____ 260—27

MORRIS LIEBMAN, *Primary Examiner.*

J. S. WALDRON, S. L. FOX, *Assistant Examiners.*